(12) United States Patent
Ogawa et al.

(10) Patent No.: US 12,125,481 B2
(45) Date of Patent: Oct. 22, 2024

(54) DETERMINATION DEVICE, TRAINING DEVICE, DETERMINATION METHOD, AND DETERMINATION PROGRAM

(71) Applicant: NIPPON TELEGRAPH AND TELEPHONE CORPORATION, Tokyo (JP)

(72) Inventors: Atsunori Ogawa, Musashino (JP); Marc Delcroix, Musashino (JP); Shigeki Karita, Musashino (JP); Tomohiro Nakatani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 381 days.

(21) Appl. No.: 17/625,336

(22) PCT Filed: Aug. 8, 2019

(86) PCT No.: PCT/JP2019/031517
§ 371 (c)(1),
(2) Date: Jan. 7, 2022

(87) PCT Pub. No.: WO2021/024491
PCT Pub. Date: Feb. 11, 2021

(65) Prior Publication Data
US 2022/0262356 A1    Aug. 18, 2022

(51) Int. Cl.
*G10L 15/08*    (2006.01)
*G06N 7/01*    (2023.01)
(Continued)

(52) U.S. Cl.
CPC .............. *G10L 15/197* (2013.01); *G06N 7/01* (2023.01); *G10L 15/063* (2013.01); *G10L 15/16* (2013.01); *G10L 15/22* (2013.01)

(58) Field of Classification Search
None
See application file for complete search history.

(56) References Cited

U.S. PATENT DOCUMENTS 10,032,463 B1 * 7/2018 Rastrow ................ G10L 15/183
11,043,214 B1 * 6/2021 Hedayatnia ............ G06N 20/10
(Continued)

OTHER PUBLICATIONS

Ogawa et al., "Rescoring N-Best Speech Recognition List Based on One-on-One Hypothesis Comparison Using Encoder-Classifier Model", IEEE International Conference on Acoustics, Speech and Signal Processing (ICASSP), Apr. 15, 2018, pp. 6099-6103.

*Primary Examiner* — Seong-Ah A Shin
(74) *Attorney, Agent, or Firm* — XSENSUS LLP

(57) ABSTRACT

A reranking device include a hypothesis input unit configured to receive input of N-best hypotheses associated with scores of a speech recognition accuracy; a hypothesis selection unit configured to select two hypotheses to be determined from among the input N-best hypotheses. Further, there is a determination unit configured to determine which accuracy of two hypotheses is higher by using: a plurality of first auxiliary model to M-th auxiliary model represented by such a neural network as to be capable of converting, when the selected two hypotheses are given, the two hypotheses into hidden state vectors, and determining which of the two hypotheses is higher based on the hidden state vectors of the two hypotheses; and a main model represented by such a neural network as to be capable of determining which of the two hypotheses is higher based on the hidden state vectors of the two hypotheses.

8 Claims, 10 Drawing Sheets

(51) Int. Cl.
    *G10L 15/06*     (2013.01)
    *G10L 15/16*     (2006.01)
    *G10L 15/197*     (2013.01)
    *G10L 15/22*     (2006.01)

(56) References Cited

U.S. PATENT DOCUMENTS

| | | | |
|---|---|---|---|
| 11,928,577 B2 * | 3/2024 | Krizhevsky | G06N 3/08 |
| 2004/0186714 A1 * | 9/2004 | Baker | G10L 15/08 |
| | | | 704/E15.014 |
| 2015/0324686 A1 * | 11/2015 | Julian | G06N 3/08 |
| | | | 706/25 |
| 2017/0221474 A1 * | 8/2017 | Hori | G10L 15/08 |
| 2017/0372694 A1 * | 12/2017 | Ushio | G10L 21/0272 |
| 2018/0330718 A1 * | 11/2018 | Hori | G06N 3/08 |
| 2022/0101082 A1 * | 3/2022 | Vinyals | G06F 40/40 |

* cited by examiner

DETERMINATION DEVICE, TRAINING DEVICE, DETERMINATION METHOD, AND DETERMINATION PROGRAM

CROSS-REFERENCE TO RELATED APPLICATION

The present application is based on PCT filing PCT/JP2019/031517, filed Aug. 8, 2019, the entire contents of which are incorporated herein by reference.

TECHNICAL FIELD

The present invention relates to a determination device, a learning device, a determination method, and a determination program.

BACKGROUND ART

Speech recognition is a technology of converting a speech (utterance) uttered by a person into a string of words (text) by a computer. In general, a speech recognition system outputs one string of words (one-best hypothesis), which is a hypothesis (speech recognition result) with the highest speech recognition score, for one input utterance. The accuracy of speech recognition by a speech recognition device is not 100%. Thus, there is a technique called N-best rescoring, which does not output only one-best hypothesis for one input utterance but outputs N ($\geq 2$) hypotheses for one input utterance, and uses an N-best rescoring device to output a hypothesis estimated to have the highest speech recognition accuracy among the N hypotheses as a definitive speech recognition result. N-best rescoring and N-best reranking are treated to have the same meaning.

The N-best rescoring method outputs a predetermined number (N) of hypotheses with higher scores among hypotheses, which are speech recognition results. Then, in the N-best rescoring method, the most plausible hypothesis among the hypotheses is output as a speech recognition result. A hypothesis with the highest score is not necessarily the best hypothesis. Thus, there is proposed a reranking device that selects a plausible hypothesis by repeatedly applying a two-choice problem that selects the most plausible hypothesis (hypothesis closest to correct answer) out of two hypotheses by a tournament method (for example, refer to NPL 1).

CITATION LIST

Non Patent Literature

[NPL 1] Atsunori Ogawa, Marc Delcroix, Shigeki Karita, Tomohiro Nakatani, "RESCORING N-BEST SPEECH RECOGNITION LIST BASED ON ONE-ON-ONE HYPOTHESIS COMPARISON USING ENCODER-CLASSIFIER MODEL", IEEE International Conference on Acoustics, Speech and Signal Processing (ICASSP), pp. 6099-6103, 2018.

SUMMARY OF THE INVENTION

Technical Problem

The reranking method described in NPL 1 repeatedly performs the processing of arranging N hypotheses in descending order of score, selecting two hypotheses in order from the top hypothesis (hypothesis with highest score), inputting those hypotheses into a neural network (NN) that solves a learned two-choice problem, and selecting one hypothesis, and outputs a hypothesis selected last as a speech recognition result. In the reranking method described in NPL 1, a speech recognition result is output with a certain level of accuracy, but in recent years, there has been a demand for stabilization of accuracy of output of a speech recognition result.

The present invention has been made in view of the above, and has an object to provide a determination device, a learning device, a determination method, and a determination program, which are capable of determining a hypothesis with the highest accuracy with a stable accuracy for a plurality of hypotheses given as solution candidates for a speech signal.

Means for Solving the Problem

In order to solve the above-mentioned problem and achieve an object, a determination device according to the present invention includes an input unit configured to receive input of N-best hypotheses associated with scores of a speech recognition accuracy; a selection unit configured to select two hypotheses to be determined from among the input N-best hypotheses; and a determination unit configured to determine which accuracy of two hypotheses is higher by using: a plurality of auxiliary models represented by such a neural network as to be capable of converting, when the selected two hypotheses are given, the two hypotheses into hidden state vectors, and determining which of the two hypotheses is higher based on the hidden state vectors of the two hypotheses; and a main model represented by such a neural network as to be capable of determining which of the two hypotheses is higher based on the hidden state vectors of the two hypotheses converted by the plurality of auxiliary models, respectively.

A learning device according to the present invention includes an input unit configured to receive input of two hypotheses for learning for which a speech recognition accuracy is known; and a learning unit configured to cause a plurality of auxiliary models and a main model to perform multitask learning that assumes each neural network individually performs a task of determining which accuracy of two hypotheses is higher, the plurality of auxiliary models being represented by such a neural network as to be capable of converting, when the two hypotheses are given, the two hypotheses into hidden state vectors, and determining which of the two hypotheses is higher based on the hidden state vectors of the two hypotheses, the main model being represented by such a neural network as to be capable of determining which of the two hypotheses is higher based on the hidden state vectors of the two hypotheses converted by the plurality of auxiliary models, respectively.

Furthermore, a determination method according to the present invention is a determination method to be executed by a determination device, the determination method including: a procedure of receiving input of N-best hypotheses associated with scores of a speech recognition accuracy; a procedure of selecting two hypotheses to be determined from among the input N-best hypotheses; and a procedure of determining which accuracy of two hypotheses is higher by using: a plurality of auxiliary models represented by such a neural network as to be capable of converting, when the selected two hypotheses are given, the two hypotheses into hidden state vectors, and determining which of the two hypotheses is higher based on the hidden state vectors of the two hypotheses; and a main model represented by such a neural network as to be capable of determining which of the two hypotheses is higher based on the hidden state vectors of the two hypotheses converted by the plurality of auxiliary models, respectively.

Furthermore, a determination program according to the present invention causes a computer to execute: a step of receiving input of N-best hypotheses associated with scores of a speech recognition accuracy; a step of selecting two hypotheses to be determined from among the input N-best hypotheses; and a step of determining which accuracy of two hypotheses is higher by using: a plurality of auxiliary models represented by such a neural network as to be capable of converting, when the selected two hypotheses are given, the two hypotheses into hidden state vectors, and determining which of the two hypotheses is higher based on the hidden state vectors of the two hypotheses; and a main model represented by such a neural network as to be capable of determining which of the two hypotheses is higher based on the hidden state vectors of the two hypotheses converted by the plurality of auxiliary models, respectively.

Effects of the Invention

According to the present invention, it is possible to determine a hypothesis with the highest accuracy with a stable accuracy for a plurality of hypotheses given as solution candidates for a speech signal.

DESCRIPTION OF EMBODIMENTS

Figure 1:
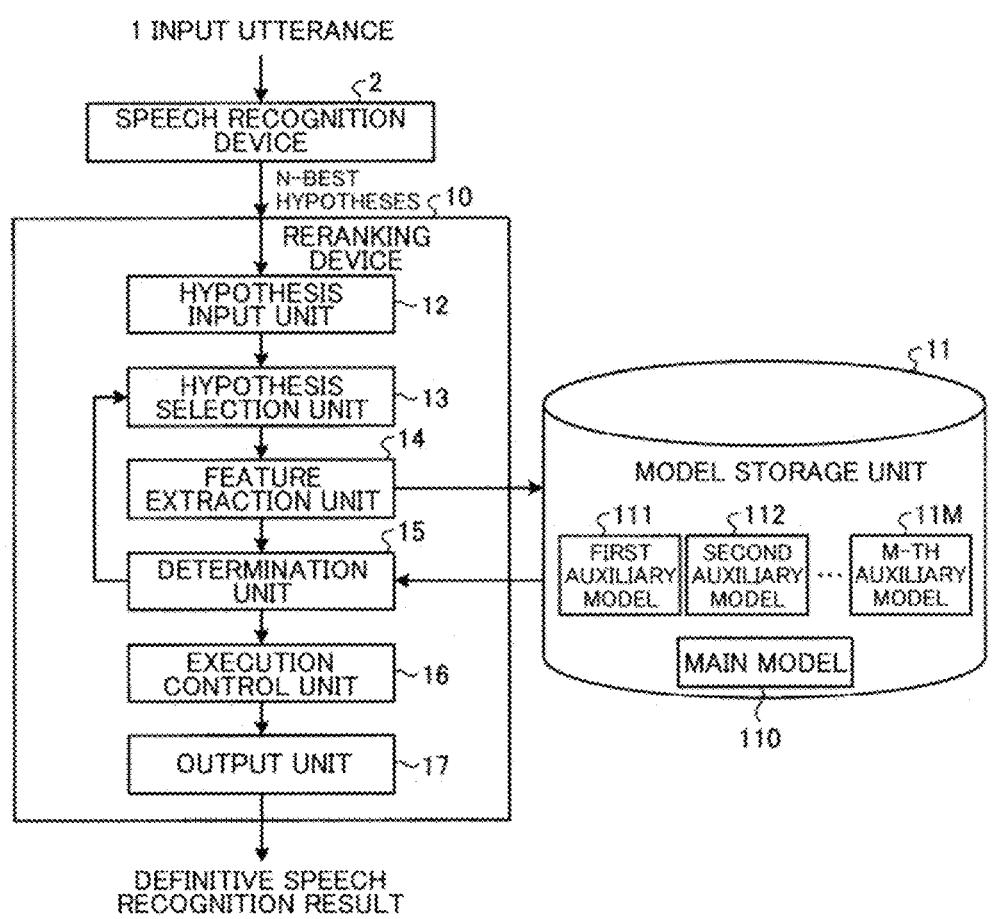
FIG. 1 is a diagram illustrating an exemplary functional configuration of a reranking device according to a first embodiment.

Now, description is given in detail of an embodiment of the present invention with reference to the drawings. This embodiment does not limit the present invention. Furthermore, in the description of the drawings, the same components are assigned with the same reference numerals.

In this embodiment, description is given of a reranking device configured to use a model for obtaining a hypothesis (string of words) with the highest speech recognition accuracy, which is a definitive speech recognition result among N (N≥2) —best hypotheses being speech recognition results, and a learning device configured to implement a model to be used for N-best reranking processing. In this embodiment, N-best rescoring is represented by N-best reranking in a unified manner for description.

First, description is given of a minimum required function to be included in a model in this embodiment for the reranking device according to this embodiment to rerank N-best hypotheses. This embodiment has an object to find out a hypothesis (oracle hypothesis) with the highest speech recognition accuracy as a definitive speech recognition result from among N-best hypotheses.

This embodiment focuses on the following point. Specifically, the following point is that the minimum required function of the model to find out an oracle hypothesis from among N-best hypotheses by reranking is the capability to determine which hypothesis has a higher speech recognition accuracy when two hypotheses are focused on among the N-best hypotheses. In other words, the minimum required function of the model in this embodiment is the capability to perform one-to-one hypothesis comparison for two hypotheses among N-best hypotheses.

In view of the above, the reranking device according to this embodiment has a function of determining a hypothesis with a higher speech recognition accuracy out of two hypotheses by using a model with a function of comparing two hypotheses on a one-to-one basis. Furthermore, in this embodiment, a main model represented by a neural network (NN) and a plurality of auxiliary models represented by a NN are used as the model. Each auxiliary model is a model of converting, when two hypotheses are given, the two hypotheses into hidden state vectors, and determining which accuracy of the two hypotheses is higher based on the two hidden state vectors of the two hypotheses. The main model is a model of determining which accuracy of the two hypotheses is higher based on the hidden state vectors of the two hypotheses converted by the plurality of auxiliary models, respectively.

Then, the reranking device according to this embodiment selects two hypotheses in ascending order of score of N-best hypotheses, and keeps a hypothesis with a higher speech recognition accuracy out of the selected two hypotheses as one hypothesis for the next determination. Then, the reranking device selects the other hypothesis in ascending order from among hypotheses left to be determined, and performs comparison using the plurality of auxiliary models and the main model. The reranking device according to this embodiment selects a hypothesis determined to have a higher speech recognition accuracy in previous determination as one hypothesis to be determined, selects a hypothesis with the lowest order from among hypotheses left to be determined as the other hypothesis, and performs comparison processing for the two hypotheses by using the plurality of auxiliary models and the main model in a repeated manner. In this manner, this embodiment achieves the capability to find out an oracle hypothesis from among N-best hypotheses with a stable accuracy.

First Embodiment

[Reranking Device]

First, description is given of a reranking device according to a first embodiment. The reranking device repeatedly determines which speech recognition accuracy is higher for two hypotheses among N-best hypotheses, which are speech recognition results, and outputs a hypothesis with the highest speech recognition accuracy as a definitive speech recognition result.

FIG. 1 is a diagram illustrating an exemplary functional configuration of the reranking device according to the first embodiment. The reranking device 10 according to the first embodiment is implemented by, for example, a computer including, for example, a read only memory (ROM), a random access memory (RAM), and a central processing unit (CPU) reading a predetermined program and the CPU executing a predetermined program.

The reranking device 10 is configured to receive input of N-best hypotheses output from the speech recognition device 2. Then, the reranking device 10 executes, for all the N-best hypotheses, determination of which speech recognition accuracy is higher for two hypotheses among the N-best hypotheses, and associates a hypothesis kept as having the highest speech recognition accuracy with a score, to output the hypothesis as a definitive speech recognition result. When the speech recognition device 2 receives input of one utterance, for example, the speech recognition device 2 executes speech recognition by using a model for speech recognition, and outputs N-best hypotheses as speech recognition results. The model for speech recognition is learned (model parameter is optimized) by using a plurality of utterances for learning and transcripts (correct string of words) corresponding to respective utterances as learning data.

The reranking device 10 includes a model storage unit 11, a hypothesis input unit 12, a hypothesis selection unit 13 (selection unit), a feature extraction unit 14, a determination unit 15, an execution control unit 16, and an output unit 17.

The model storage unit 11 stores an auxiliary model and a main model 110. In the example of FIG. 1, the model storage unit 11 stores a first auxiliary model 111 to an M-th auxiliary model 11M as the auxiliary model. The first auxiliary model 111 to M-th auxiliary model 11M and the main model 110 are models represented by a NN. The first auxiliary model 111 to M-th auxiliary model 11M and the main model 110 are learned in advance by using N-best hypotheses for learning for which the speech recognition accuracy is known.

The first auxiliary model auxiliary 11 to M-th auxiliary model 11M are represented by a NN. The NN can convert, when selected two hypotheses are given, the two hypotheses into hidden state vectors, and determine which accuracy of the two hypotheses is higher based on the hidden state vectors of the two hypotheses. The first auxiliary model 111 to M-th auxiliary model 11M are learned so as to be capable of determining, when two hypotheses are given among N-best hypotheses for learning, which speech recognition accuracy of the two hypotheses is higher for the two hypotheses. The first auxiliary model 111 to M-th auxiliary model 11M each use an RNN to convert the two hypotheses into the hidden state vectors. Then, the first auxiliary model 111 to M-th auxiliary model 11M each use a NN to generate, based on the hidden state vectors, a posterior probability indicating correctness of the order of accuracies of the two hypotheses.

The main model 110 is represented by such a NN as to be capable of determining which accuracy of the two hypotheses is higher based on the hidden state vectors of the two hypotheses converted by the first auxiliary model 111 to M-th auxiliary model 11M, respectively. The main model 110 is learned so as to be capable of determining which accuracy of the two hypotheses is higher based on the hidden state vectors of the two hypotheses for learning converted by the first auxiliary model 111 to M-th auxiliary model 11M, respectively. The main model 110 uses a NN to generate, based on the hidden state vectors of the two hypotheses converted by the first auxiliary model 111 to M-th auxiliary model 11M, respectively, a posterior probability indicating correctness of the order of accuracies of the two hypotheses.

The first auxiliary model 111 to M-th auxiliary model 11M and the main model 110 execute learning by multitask learning that assumes each neural network individually performs a task of determining which accuracy of the two hypotheses is higher.

The hypothesis input unit 12 receives input of N-best hypotheses. The N-best hypotheses are output by the speech recognition device 2. Alternatively, other devices may input the N-best hypotheses into the reranking device 10 via, for example, a network.

The hypothesis selection unit 13 selects, from among the input N-best hypotheses, two hypotheses to be compared on a one-to-one basis in ascending order of score of N-best hypotheses. In first determination, the hypothesis selection unit 13 selects, as determination targets, from among N-best hypotheses, a hypothesis with the lowest score and a hypothesis with an order higher than that of the hypothesis with the lowest score by one. In subsequent determination, the hypothesis selection unit 13 selects, as one hypothesis of the two hypotheses, a hypothesis determined to have a higher speech recognition accuracy in previous determination. Then, the hypothesis selection unit 13 selects a hypothesis with the lowest score as the other hypothesis of the two hypotheses from among hypothesis left to be determined. In this manner, the hypothesis selection unit 13 selects two hypotheses to be compared in ascending order from among N-best hypotheses so as to execute one-to-one comparison for all the N-best hypotheses.

The feature extraction unit 14 extracts each feature for two hypotheses to be compared on a one-to-one basis. The feature extraction unit 14 extracts each feature for a v-th hypothesis (string of words) among N-best hypotheses to be compared on a one-to-one basis and a u-th hypothesis ($u<v \leq N$) among the N-best hypotheses. The feature extraction unit 14 extracts a feature vector in units of each word in a hypothesis. The feature vector of each word is, for example, obtained by connecting, to a word vector representing a word ID being a discrete value as a continuous value vector by word embedding processing using a NN, an auxiliary feature such as an acoustic score (logarithmic likelihood) or a language score (logarithmic probability) in units of word obtained by speech recognition processing.

The determination unit 15 uses the first auxiliary model 111 to M-th auxiliary model 11M and the main model 110 to determine, for two hypotheses to be compared on a one-to-one basis, which accuracy of the two hypotheses is higher. The determination unit 15 inputs the v-th hypothesis and the u-th hypothesis, which are to be compared on a one-to-one basis, into each of the first auxiliary model 111 to M-th auxiliary model 11M, and uses the result of output from the main model 110 to determine which hypothesis has a higher speech recognition accuracy. The order of hypotheses represented as the u-th hypothesis and the v-th hypothesis is given in advance among the N-best hypotheses. The reranking device 10 does not reset the order.

When the feature of the u-th hypothesis and the feature of the v-th hypothesis are input to the first auxiliary model 111 to M-th auxiliary model 11M, the first auxiliary model 111 to M-th auxiliary model 11M each output a posterior probability indicating that the u-th hypothesis has a higher speech recognition accuracy that that of the v-th hypothesis.

When the hidden state vectors of two hypotheses converted by the first auxiliary model 111 to M-th auxiliary model 11M, respectively, are input to the main model 110, the main model 110 outputs a posterior probability indicating that the u-th hypothesis has a speech recognition accuracy higher than that of the v-th hypothesis. When the posterior probability output from the main model 110 is equal to or larger than 0.5, the determination unit 15 determines that the u-th hypothesis has a speech recognition accuracy higher than that of the v-th hypothesis. On the other hand, when the posterior probability output from the main model 110 is smaller than 0.5, the determination unit 15 determines that the v-th hypothesis has a speech recognition accuracy higher than that of the u-th hypothesis.

In the reranking device 10, the first auxiliary model 111 to M-th auxiliary model 11M may have the function of the feature extraction unit 14. In this case, the determination unit 15 inputs two hypotheses to be compared into each of the first auxiliary model 111 to M-th auxiliary model 11M.

The determination unit 15 keeps, out of two sequences to be compared, a hypothesis determined to have a higher accuracy as a comparison target at the time of next determination, and excludes the other hypothesis from subsequent comparison targets. The hypothesis selection unit 13 selects a hypothesis determined to have a higher accuracy by the determination unit 15 as one hypothesis of two sequences. Then, the hypothesis selection unit 13 selects, from among hypotheses left to be determined by the determination unit 15, a hypothesis with the lowest score as the other hypothesis. Specifically, as described above, the hypothesis selection unit 13 selects the hypothesis kept by the determination unit 15 as one hypothesis of the two hypotheses, and selects, from among the N-best hypotheses, a hypothesis with an order higher than that of the hypothesis compared immediately before by one as the other hypothesis of the two hypotheses.

The execution control unit 16 performs control of repeating determination processing by the determination unit 15 and selection processing by the hypothesis selection unit 13 until a predetermined condition is reached. In this case, the execution control unit 16 performs control of repeating selection processing of two hypotheses to be compared by the hypothesis selection unit 13, feature extraction processing by the feature extraction unit 14, and determination processing by the determination unit 15 so as to execute one-to-one comparison for all the N-best hypotheses. Specifically, the execution control unit 16 performs control of repeating the hypothesis selection processing, the feature extraction processing, and the determination processing until comparison processing is performed for the first hypothesis.

When the predetermined condition is reached as a result of repeating the hypothesis selection processing, the feature extraction processing, the determination processing, and the order setting processing, the output unit 17 outputs, among the N-best hypotheses, a hypothesis kept as a comparison target, as a hypothesis with the highest speech recognition accuracy, namely, a definitive speech recognition result. The output unit 17 outputs a hypothesis determined to have a higher accuracy in the last determination processing as a definitive speech recognition result.

Definition

First, a functional requirement minimum required for the reranking device 10 is defined by a numerical expression. $W^{(u)}=w_1^{(u)}, w_2^{(u)}, \ldots, w_{L(W(u))}^{(u)}$ is defined as the u-th hypothesis (string of words) in the N-best hypotheses. Furthermore, $L(W^{(u)})$ is defined as the length (number of words) of $W^{(u)}$.

$A^{(u)}=a_1^{(u)}, a_2^{(u)}, \ldots, a_{L(W(u))}^{(u)}$ is defined as an auxiliary feature vector string corresponding to $W^{(u)}$. The auxiliary feature vector $a_i^{(u)}$ of an i-th word $w_i^{(u)}$ in $W^{(u)}$ is, for example, an acoustic score (logarithmic likelihood) or a language score (logarithmic probability) obtained as a result of speech recognition processing by the speech recognition device (refer to, for example, A. Ogawa and T. Hori, "Error detection and accuracy estimation in automatic speech recognition using deep bidirectional recurrent neural networks", Speech Communication, vol. 89, pp. 70-83, May 2017 (hereinafter referred to as Reference Literature 1) for details).

The auxiliary feature vector $a_i^{(u)}$ includes a seventeen dimensional basic auxiliary feature vector. Furthermore, in the auxiliary feature vector $a_i(u)$, the word prediction score of forward LSTMLM may be used as an auxiliary feature in the eighteenth dimension. The LSTMLM is a recurrent neural network (RNN) language model that uses a long short-term memory (LSTM), and is a model that constructs each auxiliary model in the first to third embodiments as described later. Then, in the auxiliary feature vector $a_i^{(u)}$, the word prediction score of a backward LSTMLM may be used as an auxiliary feature in the nineteenth dimension. The backward LSTMLM predicts an occurrence probability of a current word based on a future string of words, and has a word prediction capability that complements the forward LSTMLM, and thus improvement in accuracy of determination information output from each auxiliary model is expected.

Furthermore, $X^{(u)}=x_1^{(u)}, x_2^{(u)}, \ldots, x_{L(W(u))}^{(u)}$ is defined as a sequence of feature vectors corresponding to $W^{(u)}$. The feature vector $w_i^{(u)}$ of the i-th word $w_i^{(u)}$ in $W^{(u)}$ is obtained by $x_i^{(u)}=$concat (embed $(w_i^{(u)})$, $a_i^{(u)}$). Concat (•) represents concatenation processing of vectors. Furthermore, embed (•) represents word embedding processing by a NN (processing of representing a word ID being a discrete value as a continuous value vector) (refer to, for example, Y. Tsuboi, Y. Unno, and J. Suzuki, "Natural language processing by deep learning", MLP machine learning professional series, Kodansha, 2017 (hereinafter referred to as Reference Literature 2) for details). The NN that performs embed (•) is also a part of the first auxiliary model 111 to M-th auxiliary model 11M, and the parameters are learned (optimized) at the same time as the parameters of an encoder RNN and a binary classification FFNN described later.

Then, $P(0|X^{(u)}, X^{(v)})$ is defined as a posterior probability indicating correctness of the order of accuracy of the two hypotheses $W^{(u)}$ and $W^{(v)}$. $P(0|X^{(u)}, X^{(v)})$ is generated in each of the first auxiliary model 111 to M-th auxiliary model 11M and the main model 110.

[Configurations of Auxiliary Model and Main Model]

Figure 2:
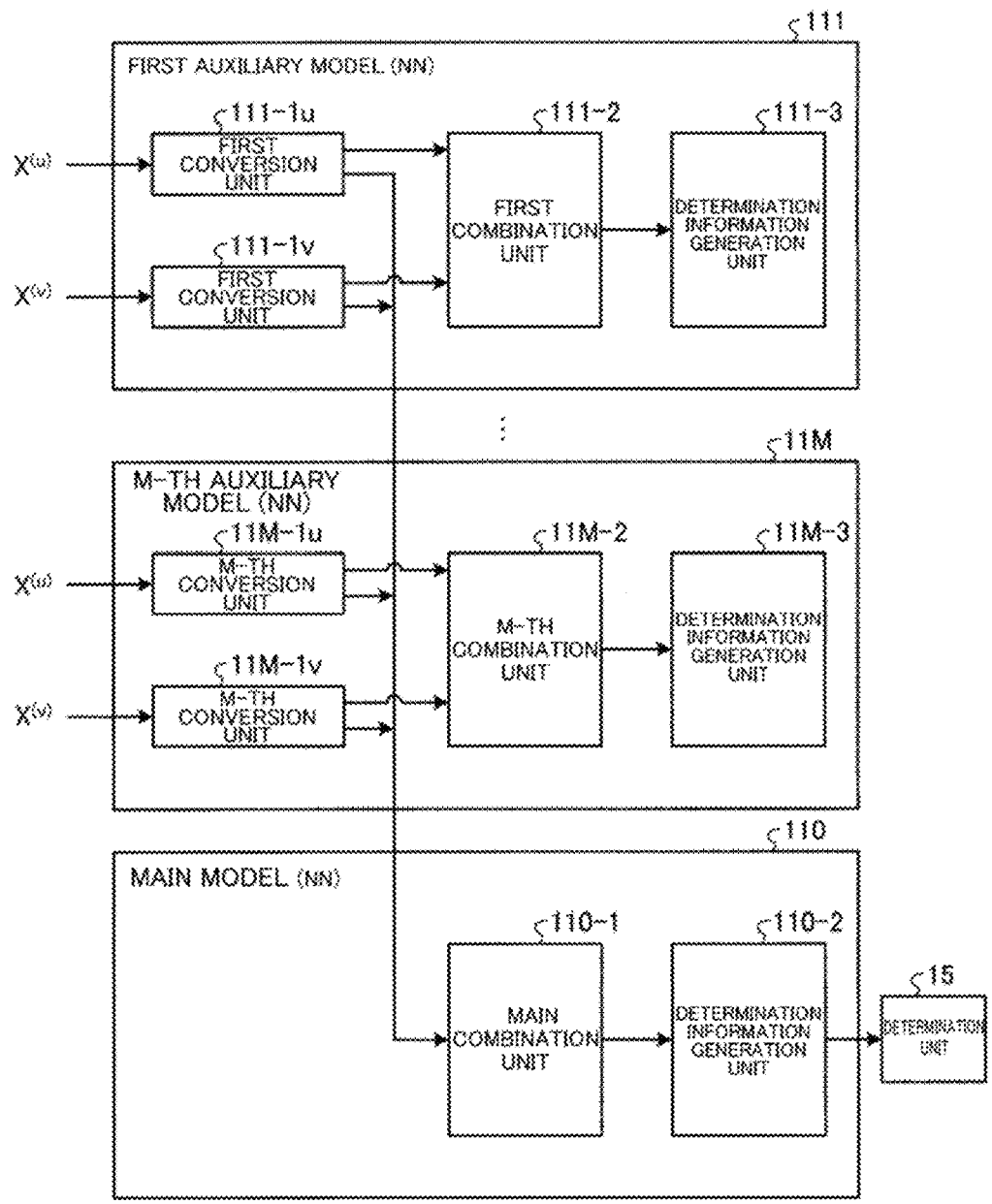
FIG. 2 is a diagram describing configurations of first to M-th auxiliary models and a main model.

Now, description is given of the first auxiliary model 111 to M-th auxiliary model 11M and the main model and the configurations thereof. FIG. 2 is a diagram describing the configurations of the first auxiliary model 111 to M-th auxiliary model 11M and the main model 110. In FIG. 2, the determination unit 15 is also described to describe the flow of processing.

As illustrated in FIG. 2, each auxiliary model includes two first conversion units, a first combination unit, and a determination information generation unit. Specifically, description is given by taking the first auxiliary model 111 as an example. The first auxiliary model 111 includes two first conversion units 111-1$u$ and 111-1$v$, a first combination unit 111-2, and a determination information generation unit 111-3.

The first conversion unit 111-1$u$ receives input of a feature $X^{(u)}$ of the hypothesis $W^{(u)}$ out of the two hypotheses $W^{(u)}$ and $W^{(v)}$ to be compared, and converts the feature $X^{(u)}$ into a hidden state vector. The first conversion unit 111-1$v$ receives input of a feature $X^{(v)}$ of the hypothesis $W^{(v)}$ out of the two hypotheses $W^{(u)}$ and $W^{(v)}$ to be compared, and converts the feature $X^{(v)}$ into a hidden state vector.

The first combination unit 111-2 combines the two hidden state vectors converted by the first conversion unit 111-1$u$ and the first conversion unit 111-1$v$, respectively. The determination information generation unit 111-3 generates, as determination information, a posterior probability P $(0|X^{(u)}, X^{(v)})$ indicating correctness of the order of accuracy of the two hypotheses $W^{(u)}$ and $W^{(v)}$. Other auxiliary models also have the same configuration as that of the first auxiliary model 111, and two given hypotheses $W^{(u)}$ and $W^{(v)}$ are each allowed to be subjected to a task including conversion into a hidden state vector, combination of hidden state vectors, and generation of determination information. Each auxiliary model has a different initial value at the time of random initialization at the time of learning.

The main model 110 includes a main combination unit 110-1 and a determination information generation unit 110-2. The main combination unit 110-1 combines hidden state vectors of two hypotheses converted by the first auxiliary model 111 to M-th auxiliary model 11M, respectively. The determination information generation unit 111-3 generates, as determination information, a posterior probability P $(0|X^{(u)}, X^{(v)})$ indicating correctness of the order of accuracy of the two hypotheses $W^{(u)}$ and $W^{(v)}$.

When the feature vector sequences $X^{(u)}$ and $X^{(v)}$ of the u-th hypothesis $W^{(u)}$ and the v-th hypothesis $W^{(v)}$ (u<v≤N) among the N-best hypotheses are input to each auxiliary model, the main model 110 outputs a posterior probability P $(0|X^{(u)}, X^{(v)})$ with the symbol of y={0}.

The determination unit 15 receives the posterior probability P $(0|X^{(u)}, X^{(v)})$ output from the main model 110, and performs determination. P $(0|X^{(u)}, X^{(v)})$ is a posterior probability probabilistically representing correctness of the order relationship between the u-th hypothesis and v-th hypothesis. The determination unit 15 acquires the posterior probability P $(0|X^{(u)}, X^{(v)})$ output from a N-best reranking model, compares the acquired posterior probability with a predetermined threshold value, and determines which of the u-th hypothesis and the v-th hypothesis has a higher speech recognition accuracy.

Specifically, when the posterior probability P $(0|X^{(u)}, X^{(v)})$ is equal to or larger than 0.5, the determination unit 15 determines that the u-th hypothesis has a speech recognition accuracy higher than that of the v-th hypothesis, and outputs y=0. Furthermore, when the posterior probability P $(0|X^{(u)}, X^{(v)})$ is smaller than 0.5, the determination unit 15 determines that the v-th hypothesis has a speech recognition accuracy higher than that of the u-th hypothesis, and outputs y=1.

In short, the determination unit 15 determines which of the u-th hypothesis and the v-th hypothesis has a higher speech recognition accuracy as indicated by the following expressions (1-1) and (1-2).

$$P(0|X^{(u)},X^{(v)}) \geq 0.5$$

if WER(Word error rate) of $W^{(u)} \leq$ WER of $W^{(v)}$ (1-1)

$$P(0|X^{(u)},X^{(v)}) < 0.5$$

otherwise (1-2)

A function returning the speech recognition accuracy of a given hypothesis (string of words) satisfies $\Sigma_y P (y|X^{(u)}, X^{(v)})=1$, and thus when an inequality indicated by the first line of the expression (1-1) is satisfied, the determination unit 15 determines that the hypothesis $W^{(u)}$ has a speech recognition accuracy equal to or higher than that of the hypothesis $W^{(v)}$. Furthermore, when the inequality of the expression (1-2) is satisfied, the determination unit 15 determines that the hypothesis $W^{(u)}$ has a speech recognition accuracy lower than that of the hypothesis $W^{(v)}$.

Thus, when the inequality indicated by the first line of the expression (1-1) is satisfied, the ranking order relationship (u<v) between $W^{(u)}$ and $W^{(v)}$ is estimated to be correct. Thus, the determination unit 15 keeps $W^{(u)}$ as a hypothesis with a speech recognition accuracy higher than that of $W^{(v)}$ in one-to-one hypothesis comparison with $W^{(v)}$, and uses $W^{(u)}$ as $W^{(v)}$ in next one-to-one hypothesis comparison. The determination unit 15 sets $W^{(v)}$ as a hypothesis with a speech recognition accuracy lower than that of $W^{(u)}$, and excludes the hypothesis from a candidate of a hypothesis with the highest speech recognition accuracy, namely, a candidate of the definitive speech recognition result.

Then, when the inequality indicated by the first line of the expression (1-2) is satisfied, the ranking order relationship between $W^{(u)}$ and $W^{(v)}$ is estimated to be incorrect. In other words, the order relationship between $W^{(u)}$ and $W^{(v)}$ is estimated to be opposite in terms of speech recognition accuracy. Thus, the determination unit 15 keeps $W^{(v)}$ as a hypothesis with a speech recognition accuracy higher than that of $W^{(u)}$ in one-to-one comparison with $W^{(u)}$, and continues to use $W^{(v)}$ in next one-to-one hypothesis comparison. The determination unit 15 sets the original $W^{(u)}$ as a hypothesis with a speech recognition accuracy lower than that of the original $W^{(v)}$, and excludes the hypothesis from a candidate of a hypothesis with the highest speech recognition accuracy, namely, a candidate of the definitive speech recognition result.

Example of Construction of Auxiliary Model

Figure 3:
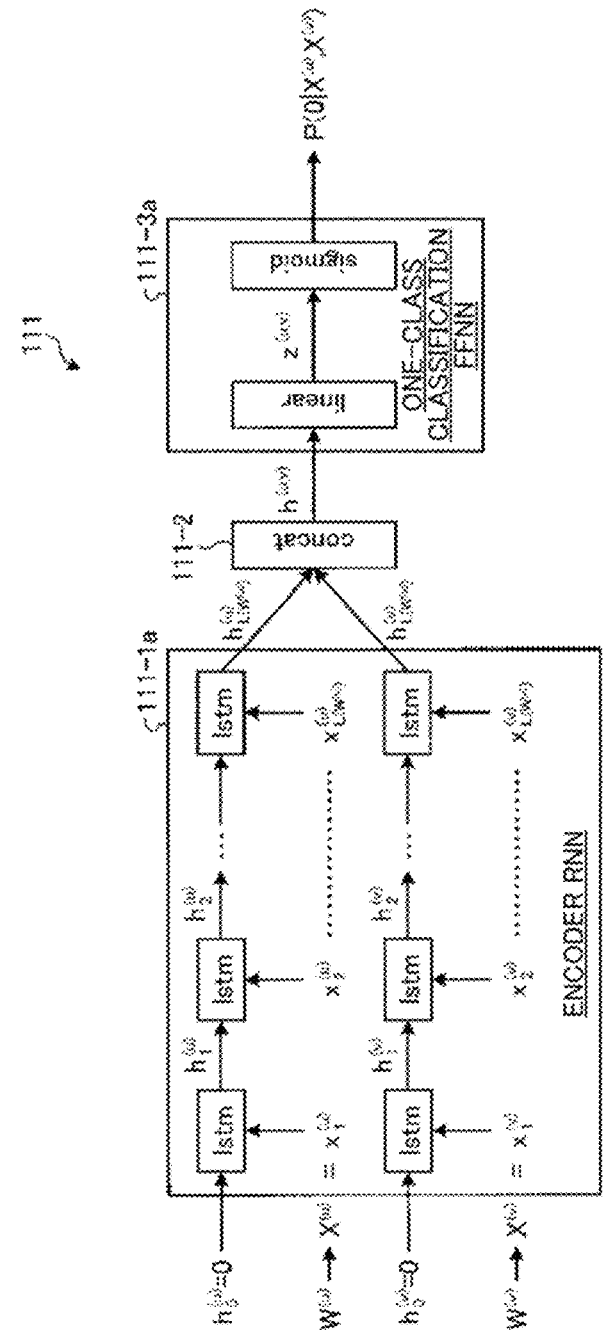
FIG. 3 is a diagram illustrating an example of construction of the first auxiliary model.

Now, description is given of an example of construction of the first auxiliary model 111 to M-th auxiliary model 11M. The first auxiliary model 111 to M-th auxiliary model 11M have the same configuration, and thus an example of construction of the first auxiliary model 111 is described with reference to FIG. 3. FIG. 3 is a diagram illustrating an example of construction of the first auxiliary model 111. In FIG. 3, for the sake of simplicity, a NN that performs word embedding processing embed (•) is omitted. Now, the details are described.

The length (word count) L ($W^{(u)}$) of the hypothesis $W^{(u)}$ and the length L ($W^{(v)}$) of the hypothesis $W^{(v)}$ (u<v≤N), which are to be compared with each other, may be different from each other. To absorb this difference in length, the first auxiliary model 111 uses an RNN to convert the features of two hypotheses into hidden state vectors. Specifically, the first auxiliary model 111 includes an encoder RNN 111-1$a$ of an encoder model (refer to, for example, Reference Literature 2 for details) as the first conversion units 111-1$u$ and 111-1$v$ to perform this processing.

The first auxiliary model 111 uses the encoder RNN 111-1$a$ to represent $W^{(u)}$ and $W^{(v)}$ by hidden state vectors with a fixed length. In this manner, the first auxiliary model 111 to M-th auxiliary model 11M can equally compare $W^{(u)}$ and $W^{(v)}$ with each other by using these hidden state vectors.

Now, description is given of the processing by the encoder RNN 111-1a. The encoder RNN 111-1a includes a long short-term memory (LSTM) unit (refer to, for example, Patent Literature 2 for details), which is one type of RNN. The LSTM unit represents an i-th hidden state vector $h_i^{(u)}$ by the following expression (2) when the feature vector $x_i^{(u)}$ of an i-th word $w_i^{(u)}$ of $W^{(u)}$ and an (i−1)-th hidden state vector $h_{\{i-1\}}^{(u)}$ are given.

$$h_i^{(u)} = \mathrm{lstm}(x_i^{(u)}, h_{\{i-1\}}^{(u)}) \tag{2}$$

lstm (•) represents the processing by a one-layer unidirectional LSTM unit. Furthermore, $h_i(u)=0$ (zero vector) is satisfied. $h_i(u)$ is obtained by encoding the feature vector sequence $x_1^{(u)}, x_2^{(u)}, \ldots, x_i(u)$ of the string of words $w_1^{(u)}, w_2^{(u)}, \ldots, w_i^{(u)}$. The encoder RNN 111-1a repeats this processing for each feature vector $x_i^{(u)}$ in the feature vector sequence $X^{(u)}$, to thereby be able to obtain a hidden state vector $h_{L(W(u))}^{(u)}$ that has encoded $X^{(u)}$.

The encoder RNN 111-1a also performs similar processing for the feature vector sequence $X^{(v)}$, and obtains a hidden state vector $h_{L(W(v))}^{(v)}$ that has encoded $X^{(v)}$. The LSTM unit that performs processing for $X^{(u)}$ and the LSTM unit that performs processing for $X^{(v)}$ may be the same, that is, may share parameters, or may be different LSTM units. Furthermore, in FIG. 3, the subscript $L(W(u))$ of $x_{L(W(u))}^{(u)}$, $x_{L(W(v))}^{(v)}$, $h_{L(W(u))}^{(u)}$, and $h_{L(W(v))}^{(v)}$ indicates $L(W^{(u)})$.

The first auxiliary model 111 obtains a hidden state vector $h^{\{(u, v)\}}$, which is obtained by combining the two hidden state vectors $h_{L(W(u))}^{(u)}$ and $h_{L(W(v))}^{(v)}$ in the first combination unit 111-2 obtained as described above, as in the following expression (3) as output of the encoder RNN 111-a.

$$h^{\{(u,v)\}} = \mathrm{concat}(h_{L(W(u))}^{(u)}, h_{L(W(v))}^{(v)}) \tag{3}$$

Then, the first auxiliary model 111 connects a NN for performing classification (y=0 or 1) to a subsequent stage of the encoder RNN 111-1a. For example, the first auxiliary model 111 uses a one-layer feedforward NN (FFNN) 111-3a (refer to, for example, Reference Literature 2 for details) as a NN for performing one-class classification to serve as the determination information generation unit 113. The hidden state vector $h^{\{(u,v)\}}$ obtained as an output of the encoder RNN 111-1a is input to the one-layer one-class classification FFNN 111-3a, and as a result, the posterior probability $P(y|X^{(u)}, X^{(v)})$ with one class of y={0} can be obtained as in the following expressions (4) and (5).

$$z^{\{(u,v)\}} = \mathrm{linear}(h^{\{(u,v)\}}) \tag{4}$$

$$P(y|X^{(u)}, X^{(v)}) = \mathrm{sigmoid}(z^{\{(u,v)\}})_y \tag{5}$$

linear (•) represents linear transformation processing (refer to, for example, Patent Literature 2 for details). Sigmoid (•) represents sigmoid processing.

Furthermore, in the main model 110, the main combination unit 110-1 performs vector combination processing similar to that of the first combination unit 111-2. Furthermore, in the main model 110, the determination information generation unit 110-3 is constructed by one-class classification FFNN with a configuration similar to that of the one-layer one-class classification FFNN 111-3a of the determination information generation unit 111-3.

Other Example 1 of Construction of Auxiliary Model and Main Model

The first auxiliary model 111 and the main model 110 may perform softmax processing instead of sigmoid processing in one-class classification FFNN. In this case, the hidden state vector $h^{\{(u,v)\}}$ obtained as an output of the encoder RNN is input to one-class binary classification FFNN, and as a result, the posterior probability $P(y|X^{(u)}, X^{(v)})$ with the symbol y={0, 1} of two classes can be obtained as in the following expressions (6) and (7). Y=0 indicates that the order relationship between the hypothesis $W^{(u)}$ and the hypothesis $W^{(v)}$ is correct. Furthermore, y=1 indicates that the order relationship between the hypothesis $W^{(u)}$ and the hypothesis $W^{(v)}$ is incorrect. $P(0|X^{(u)}, X^{(v)})$ is a first posterior probability probabilistically representing correctness of the order relationship between the u-th hypothesis and the v-th hypothesis. $P(1|X^{(u)}, X^{(v)})$ is a second posterior probability probabilistically representing incorrectness of the order relationship between the u-th hypothesis and the v-th hypothesis.

$$z^{\{(u,v)\}} = \mathrm{linear}(h^{\{(u,v)\}}) \tag{6}$$

$$P(y|X^{(u)}, X^{(v)}) = \mathrm{softmax}(z^{\{(u,v)\}})_y \tag{7}$$

softmax (•) represents softmax processing. Furthermore, softmax(•)$_y$ represents a y-th coordinate (probability value) of a posterior probability vector obtained as a result of softmax processing.

In this case, the determination unit 15 acquires the first posterior probability $P(0|X^{(u)}, X^{(v)})$ and the second posterior probability $P(1|X^{(u)}, X^{(v)})$, which are output from the main model 110, compares the magnitudes of the acquired two posterior probabilities with each other, and determines which of the u-th hypothesis and the v-th hypothesis has a higher speech recognition accuracy. When the first posterior probability $P(0|X^{(u)}, X^{(v)})$ is higher than the second posterior probability $P(1|X^{(u)}, X^{(v)})$, the determination unit 15 determines that the u-th hypothesis has a speech recognition accuracy higher than that of the v-th hypothesis. On the other hand, when the first posterior probability $P(0|X^{(u)}, X^{(v)})$ is lower than the second posterior probability $P(1|X^{(u)}, X^{(v)})$, the determination unit 15 determines that the v-th hypothesis has a speech recognition accuracy higher than that of the u-th hypothesis.

Other Example 2 of Construction of Auxiliary Model

The LSTM unit of the encoder RNN 111-1a illustrated in FIG. 3 is set as a one-layer unidirectional LSTM unit, but may be a multi-layer or bidirectional LSTM unit.

Other Example 3 of Construction of Auxiliary Model

Furthermore, a simple RNN (having activation function such as sigmoid function) or a gated recurrent unit (GRU) may be used instead of the LSTM unit.

Other Example 4 of Construction of Auxiliary Model and Main Model

Furthermore, in the example of construction of FIG. 3, the auxiliary model and the main model 110 use a one-layer feedforward NN as the one-class classification NN, but may use a multi-layer feedforward NN. In the N-best reranking model, when the multi-layer feedforward NN is used, an activation function such as a sigmoid function, a tanh function, a rectified linear unit (ReLU) function, or a parametric relu (PReLU) function can be used. Refer to, for example, Reference Literature 2 for details of terminology of other examples 1 to 4 of construction of the auxiliary model and the main model 110.

Other Example 5 of Construction of Auxiliary Model

Furthermore, in the auxiliary model, a score calculated by the related-art N-best rescoring model (for example, RNN language model) can also be added and used as an additional dimension in the feature vector.

[Processing Procedure of Reranking Processing]

Figure 4:
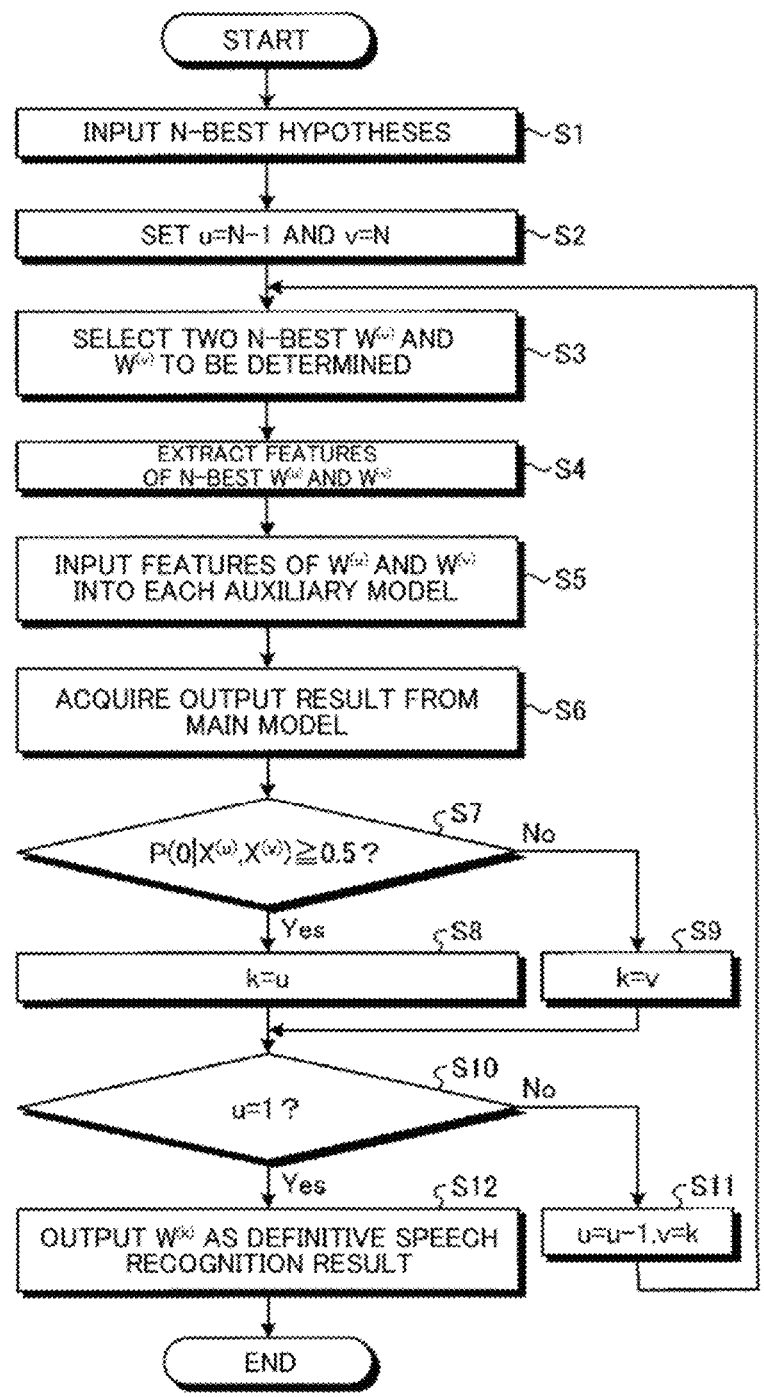
FIG. 4 is a flow chart illustrating a processing procedure of reranking processing according to the first embodiment.

Next, description is given of a processing procedure of reranking processing to be executed by the reranking device 10 illustrated in FIG. 1. FIG. 4 is a flow chart illustrating a processing procedure of reranking processing according to the first embodiment.

First, when the hypothesis input unit 12 has received input of N-best hypotheses to be reranked (Step S1), the hypothesis selection unit 13 selects, from among the input N-best hypotheses, u-th and v-th two hypotheses, which are to be compared on a one-to-one basis, in ascending order of score (u<v≤N). First, the hypothesis selection unit 13 sets u=N−1 and v=N (Step S2). Then, the hypothesis selection unit 13 selects two hypotheses, namely, u-th and v-th hypotheses $W^{(u)}$ and $W^{(v)}$ from the input N-best hypotheses (Step S3). Next, the feature extraction unit 14 extracts features of the hypotheses $W^{(u)}$ and $W^{(v)}$ (Step S4). The determination unit 15 inputs the features ($X^{(u)}$, $X^{(v)}$) of the hypotheses $W^{(u)}$ and $W^{(v)}$ into each of the auxiliary models (first auxiliary model 111 to M-th auxiliary model 11M) (Step S5).

The determination unit 15 acquires the result of output from the N-best reranking model (Step S6). Specifically, the determination unit 15 acquires the posterior probability P (0|$X^{(u)}$, $X^{(v)}$).

As described with reference to the expression (1-1) and the expression (1-2), the determination unit 15 determines whether or not P (0|$X^{(u)}$, $X^{(v)}$)≥0.5 is satisfied (Step S7). When P (0|$X^{(u)}$, $X^{(v)}$)≥0.5 is satisfied (Step S7: Yes), the determination unit 15 determines that the u-th hypothesis has a speech recognition accuracy higher than that of the v-th hypothesis, and the execution control unit 16 sets k=u for k (Step S8). k represents, among hypotheses subjected to comparison processing, an order (ranking) of a hypothesis with the highest speech recognition accuracy in N-best hypotheses. On the other hand, when P (0|$X^{(u)}$, $X^{(v)}$)≥0.5 is not satisfied (Step S7: No), the determination unit 15 determines that the v-th hypothesis has a speech recognition accuracy higher than that of the u-th hypothesis, and the execution control unit 16 sets k=v (Step S9).

Next, the execution control unit 16 determines whether or not u=1 is satisfied (Step S10). When u=1 is not satisfied (Step S10: No), not all the necessary one-to-one hypothesis comparison processing is finished yet, and thus the execution control unit 16 causes the hypothesis selection unit 13 to select a next hypothesis to be compared. Specifically, the hypothesis selection unit 13 sets u=u−1 and v=k (Step S11), and returns to Step S3 to select N-best hypotheses $W^{(u)}$, $W^{(v)}$ to be compared next. Then, the reranking device 10 executes the processing of from Step S4 to Step S10 for the N-best hypotheses $W^{(u)}$ and $W^{(v)}$.

On the other hand, when u=1 is satisfied (Step S10: Yes), all the necessary one-to-one comparison processing is finished, and thus the execution control unit 16 outputs k-th $W^{(k)}$ as a hypothesis estimated to have the highest speech recognition accuracy, namely, a definitive speech recognition result (Step S12), and finishes the processing. In this manner, the reranking device 10 sets any two hypotheses as one combination of hypotheses, and repeats determination of which speech recognition accuracy is higher for a plurality of combinations, to thereby be able to output a hypothesis estimated to have the highest speech recognition accuracy as a definitive speech recognition result.

In this manner, the reranking device 10 according to the first embodiment has a function of determining which of two hypotheses has a higher speech recognition accuracy by using a model with the function of performing one-to-one comparison of the two hypotheses. Furthermore, in the reranking device 10, the main model 110 represented by a neural network (NN) and the plurality of auxiliary models represented by NNs are used as the model.

That is, in the reranking device 10, a plurality of auxiliary models are provided, and each auxiliary model executes a task for input two hypotheses. Although the structure of each auxiliary model is the same, the parameter is subjected to random initialization at the time of learning, and thus different hidden state vectors are output for the same input hypothesis. In this manner, even when a hidden state vector output from a certain auxiliary model is not appropriate for certain two input hypotheses, another auxiliary model is more likely to be capable of outputting an appropriate hidden state vector. That is, either one of the auxiliary networks is more likely to output a hidden state vector appropriate for generation of an accurate hypothesis determination result. As a result, hidden state vectors corresponding to appropriate two hypotheses are stably input to the main model 110 of the reranking device 10, and thus the accuracy of the output value of the main model 110 is also stable. In this manner, the reranking model according to the first embodiment can find out an oracle hypothesis from among N-best hypotheses with a stable accuracy.

Figure 5:
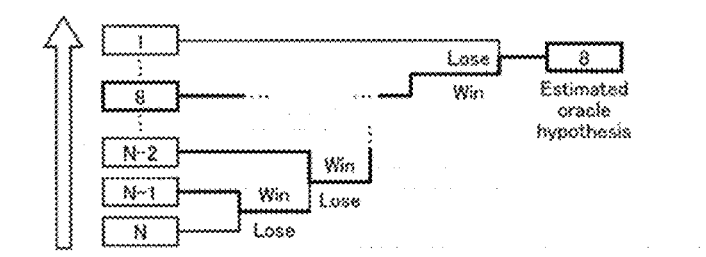
FIG. 5 is a diagram describing reranking processing to be executed for N-best hypotheses by the reranking device illustrated in FIG. 1.

Furthermore, the reranking device 10 selects two hypotheses in ascending order of score of N-best hypotheses. In other words, the reranking device 10 selects, from among N-best hypotheses, a pair of hypotheses in order from a hypothesis with the lowest score. FIG. 5 is a diagram describing reranking processing to be executed for N-best hypotheses by the reranking device 10 illustrated in FIG. 1.

In general, a hypothesis with a higher score is more likely to be a plausible hypothesis. When a hypothesis is selected in ascending order of score, a hypothesis with the highest score is not selected as a definitive output hypothesis until the hypothesis wins N−1 times of determination processing, which means that the hypothesis is less likely to be selected as a plausible hypothesis.

In view of the above, as illustrated in FIG. 5, the reranking device 10 selects, from among N-best hypotheses, a pair of hypotheses in descending order of score so that a hypothesis that is more likely to be selected as the definitive output hypothesis is subjected to a smaller number of times of determination. In other words, as illustrated in FIG. 5, the reranking device 10 gives a seed to a hypothesis with the highest score so that the hypothesis with the highest score is subjected to comparison processing at a later stage of comparison processing for all the N-best hypotheses and is likely to be selected as a plausible hypothesis. In this manner, a hypothesis that is likely to be selected as the definitive output hypothesis is likely to be selected as a plausible hypothesis, and thus the reranking device 10 can find out an oracle hypothesis from among N-best hypotheses with a stable accuracy.

Second Embodiment

[Learning Device]

Figure 6:
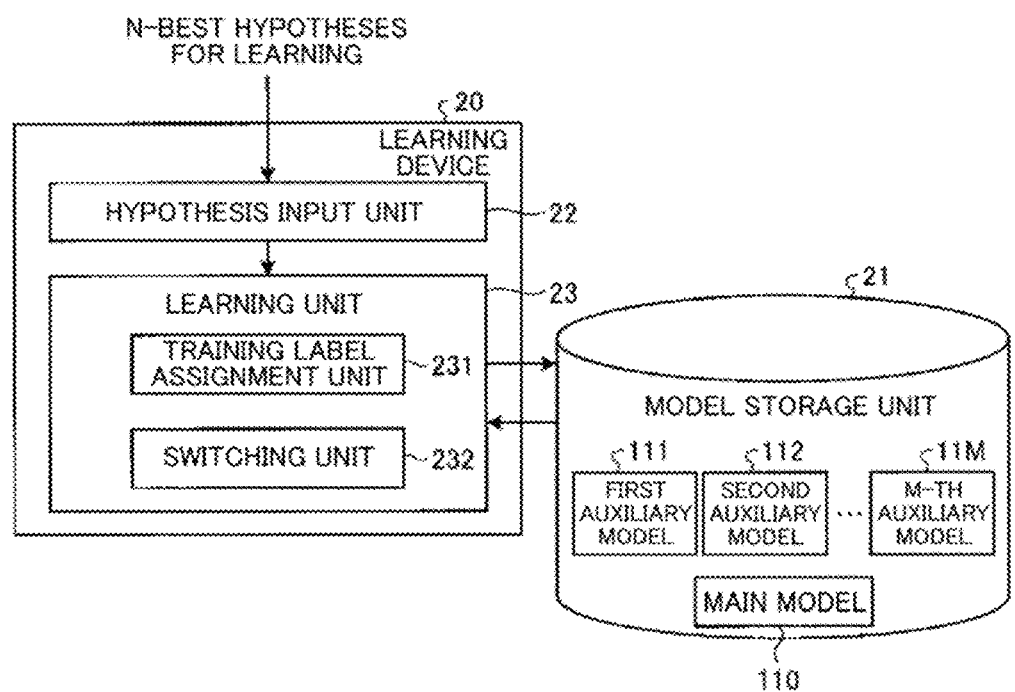
FIG. 6 is a diagram illustrating an exemplary functional configuration of a learning device according to a second embodiment.

Next, description is given of a learning device that learns an N-best reranking model to be used by the reranking device 10 in a second embodiment. FIG. 6 is a diagram illustrating an exemplary functional configuration of a learning device according to the second embodiment. The learning device 20 according to the second embodiment is implemented by, for example, a computer including a ROM, a RAM, a CPU, and other components reading a predetermined program and the CPU executing the predetermined program. As illustrated in FIG. 6, a model storage unit 21 and the learning device 20 include a hypothesis input unit 22 and a learning unit 23.

The model storage unit 21 stores the first auxiliary model 111 to M-th auxiliary model 11M and the main model 110 to be learned. The first auxiliary model 111 to M-th auxiliary model 11M and the main model 110 are represented by such a NN as to be capable of converting, when selected two hypotheses are given, the two hypotheses into hidden state vectors and determining which accuracy of the two hypotheses is higher based on the hidden state vectors of the two hypotheses. The first auxiliary model 111 to M-th auxiliary model 11M convert the two hypotheses among the N-best hypotheses into hidden state vectors by using an RNN. Then, the first auxiliary model 111 to M-th auxiliary model 11M use a NN to generate, as determination information, a posterior probability indicating correctness of the order of accuracy of the two hypotheses based on the hidden state vectors.

The main model 110 is represented by such a NN as to be capable of determining, based on the hidden state vectors of the two hypotheses converted by the first auxiliary model 111 to M-th auxiliary model 11M, respectively, which accuracy of the two hypotheses is higher. The main model 110 generates, based on the hidden state vectors of the two hypotheses for learning converted by the first auxiliary model 111 to M-th auxiliary model 11M using a NN, respectively, a posterior probability indicating correctness of the order of accuracy of the two hypotheses.

The hypothesis input unit 22 receives input of N-best hypotheses for learning for which the speech recognition accuracy is known. It is assumed that each utterance in learning data is subjected to speech recognition and N-best hypotheses of each utterance are obtained as N-best hypotheses for learning. Furthermore, the N-best hypotheses are learning data, and thus the speech recognition accuracies of all the hypotheses are known. Furthermore, as described above, it is assumed that the feature vector sequence is extracted for all the hypotheses in the N-best hypotheses.

When the features of two hypotheses among N-best hypotheses for learning are given, the learning unit 23 causes the first auxiliary model 111 to M-th auxiliary model 11M and the main model 110 to perform multitask learning that assumes each NN individually performs a task of determining which accuracy of two hypotheses is higher. The learning unit 23 calculates a predetermined loss for each task executed by each NN, and sets a weighted sum of the losses as an overall loss function. Then, the learning unit 23 updates the value of a parameter of each NN based on the overall loss function.

The learning unit 23 may give an equal weight to each loss. Furthermore, determination information output from the main model 110 is used for determination by the determination unit 15, and thus the learning unit 23 may give a larger weight to the main model 110 than other auxiliary models.

The learning unit 23 gives the feature vector sequences of two hypotheses among N-best hypotheses for learning and training labels (described later) corresponding thereto to the first auxiliary model 111 to M-th auxiliary model 11M and the main model 110. In this manner, the learning unit 23 performs learning (optimization of parameters) of the first auxiliary model 111 to M-th auxiliary model 11M and the main model 110 so that the first auxiliary model 111 to M-th auxiliary model 11M and the main model 110 can correctly determine which of these two hypotheses has a higher speech recognition accuracy.

Specifically, the learning unit 23 inputs the feature vector sequences and corresponding training labels into the first auxiliary model 111 to M-th auxiliary model 11M, and learns the first auxiliary model 111 to M-th auxiliary model 11M and the main model 110 so that the first auxiliary model 111 to M-th auxiliary model 11M and the main model 110 can correctly output corresponding training labels when these feature vectors are given. The learning unit 23 includes a training label assignment unit 231 and a switching unit 232.

The training label assignment unit 231 gives a training label (y=0) indicating correctness when a hypothesis with a higher speech recognition accuracy out of two hypotheses is given an order higher than that of the other hypothesis, to thereby cause the first auxiliary model 111 to M-th auxiliary model 11M and the main model 110 to perform learning. Furthermore, the training label assignment unit 231 gives a training label (y=1) indicating incorrectness when a hypothesis with a higher speech recognition accuracy out of two hypotheses is given an order lower than that of the other hypothesis, to thereby cause the first auxiliary model 111 to M-th auxiliary model 11M and the main model 110 to perform learning.

Figure 7:
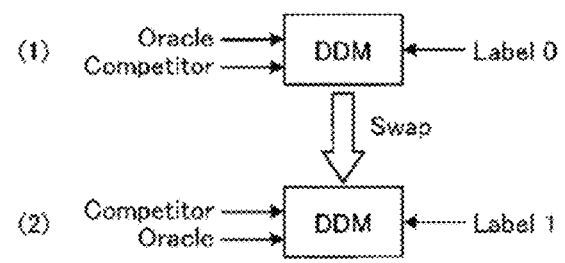
FIG. 7 is a diagram describing processing to be executed by a switching unit illustrated in FIG. 6.

The switching unit 232 switches the order of two hypotheses among N-best hypotheses and also switches the corresponding training labels to learn the first auxiliary model 111 to M-th auxiliary model 11M and the main model 110. FIG. 7 is a diagram describing processing to be executed by the switching unit 232 illustrated in FIG. 6. For example, for two hypotheses (refer to (1) of FIG. 7) to which y=0 is given as the training label, the order of two hypotheses is switched and the training label y is changed to 1 (refer to (2) of FIG. 7). Meanwhile, for two hypotheses to which y=1 is given as the training label, the order of two hypotheses is switched and the training label is changed to 0.

[Processing Procedure of Learning Processing]

Figure 8:
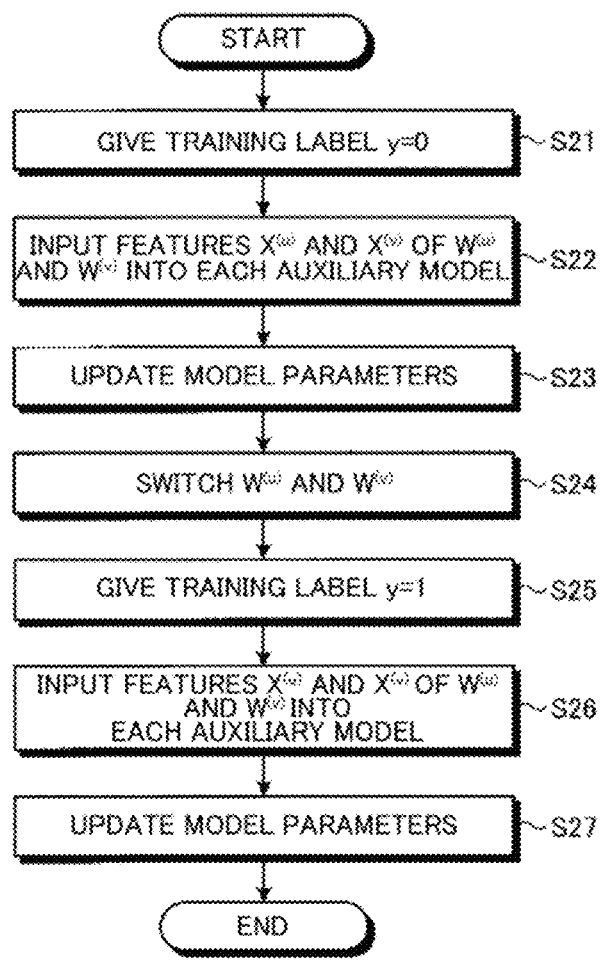
FIG. 8 is a flow chart illustrating a processing procedure of learning processing according to the second embodiment.

Next, description is given of a processing procedure of learning processing to be executed by the learning device 20 illustrated in FIG. 6. FIG. 8 is a flow chart illustrating a processing procedure of learning processing according to the second embodiment. In FIG. 8, $W^{(u)}$ and $W^{(v)}$ (u<v≤N) are given as two hypotheses among N-best hypotheses, and the processing procedure of learning processing at the time when the accuracy of $W^{(u)}$ is higher than the accuracy of $W^{(v)}$ is illustrated.

As illustrated in FIG. 8, the training label assignment unit 231 gives a training label y=0 (Step S21), and inputs the features $X^{(u)}$ and $X^{(v)}$ of $W^{(u)}$ and $W^{(v)}$ into the first auxiliary model 111 to M-th auxiliary model 11M (Step S22). Then, the learning unit 23 causes the first auxiliary model 111 to M-th auxiliary model 11M and the main model 110 to perform multitask learning to update the model parameters of the first auxiliary model 111 to M-th auxiliary model 11M and the main model 110 (Step S23).

That is, when the features $X^{(u)}$ and $X^{(v)}$ of the two hypotheses $W^{(u)}$ and $W^{(v)}$ are input into the first auxiliary model 111 to M-th auxiliary model 11M, the first auxiliary model 111 to M-th auxiliary model 11M and the main model 110 are assumed to ideally output the posterior probability of $P(0|X^{(u)}, X^{(v)})=1$. Thus, the training label assignment unit 231 gives y=0 as the training label. On the basis of the input described above, the learning unit 23 updates the model parameters (updates parameters of NN that performs encoder RNN (LSTM unit), one-class classification FFNN, and word embedding processing embed ( ) at the same time) of the first auxiliary model 111 to M-th auxiliary model 11M and the main model 110.

Then, the switching unit 232 switches the order of hypotheses $W^{(u)}$ and $W^{(v)}$ (Step S24). That is, the switching unit 232 sets a hypothesis that has originally been $W^{(v)}$ as $W^{(u)}$, whereas the switching unit 232 sets a hypothesis that has originally been $W^{(u)}$ as $W^{(v)}$. In this case, the accuracy of $W^{(u)}$ is lower than the accuracy of $W^{(v)}$. Thus, when the feature vectors $X^{(u)}$ and $X^{(v)}$ of the two hypotheses $W^{(u)}$ and $W^{(v)}$ are input into the first auxiliary model 111 to M-th auxiliary model 11M and the main model 110, the first auxiliary model 111 to M-th auxiliary model 11M and the main model 110 are assumed to ideally output the posterior probability of $P(0|X^{(u)}, X^{(v)})=0$.

Thus, the training label assignment unit 231 gives y=1 as the training label (Step S25), and inputs the features $X^{(u)}$ and $X^{(v)}$ of $W^{(u)}$ and $W^{(v)}$ into the first auxiliary model 111 to M-th auxiliary model 11M and the main model 110 (Step S26). On the basis of the input descried above, the learning unit 23 cause the first auxiliary model 111 to M-th auxiliary model 11M and the main model 110 to perform multitask learning, updates the first auxiliary model 111 to M-th auxiliary model 11M and the main model 110 (Step S27), and finishes the learning processing for the two hypotheses $W^{(u)}$ and $W^{(v)}$.

The learning device 20 repeats the above-mentioned procedure for N-best hypotheses of each utterance in learning data, and further repeats the repetition itself several times (several epochs). The learning unit 23 can perform a further specific procedure of learning similarly to related-art NN learning (refer to, for example, Reference Literature 2 for details).

Effect of Second Embodiment

In this manner, the learning device 20 according to the second embodiment causes the first auxiliary model 111 to M-th auxiliary model 11M and the main model 110 to perform multitask learning in advance so as to be capable of determining which speech recognition accuracy is higher for a plurality of combinations by setting two hypotheses among N-best hypotheses for learning for which the speech recognition accuracy is known as one combination. Therefore, the learning device 20 can implement, based on the latest NN, the first auxiliary model 111 to M-th auxiliary model 11M and the main model 110, which are optimized to perform N-best reranking. Then, the reranking device 10 can accurately compare two hypotheses with each other on a one-to-one basis by using the first auxiliary model 111 to M-th auxiliary model 11M and the main model 110 learned by the learning device 20, and can extract an oracle hypothesis with a stable system.

First Example of Optimizing Learning Processing

The processing procedure of learning processing illustrated in FIG. 8 has a high calculation cost. For example, when E indicates the number of epochs, and M represents the number of utterances in learning data, the number of times of update of the model parameters in the above-mentioned learning procedure is $E \times M \times N \times 2 \times {}_N C_2$ at the maximum. Usually, E is about several tens, M is at least tens of thousands, N is about 100 to 1000 as described above, and thus the number of times of update of the model parameters becomes enormous. Thus, in this embodiment, it is preferred to achieve optimization of learning. Now, description is given of a first example of optimizing learning below.

As described above, the main purpose of N-best rescoring is to find out an oracle hypothesis as a definitive speech recognition result from among N-best hypotheses. In other words, an oracle hypothesis may be distinguished from other N−1 hypotheses accurately. In order to achieve this distinction, one of two hypotheses to be input into the N-best reranking model at the time of learning is set as an oracle hypothesis. In this manner, it is possible to reduce the number of times of update of the model parameters to $E \times M \times N \times 2 \times (N-1)$.

Second Example of Optimizing Learning Processing

Next, description is given of a second example of optimizing learning. In the first example of learning, when N-best hypotheses are given, an oracle hypothesis and the other N−1 hypotheses included in the N-best hypotheses are compared with one another. In a second example of optimizing learning processing, the number of other hypotheses to be compared with the oracle hypothesis is narrowed down.

For example, first, the following four typical hypotheses are selected.

A hypothesis 1 is a hypothesis with the second highest speech recognition accuracy next to the oracle hypothesis.

A hypothesis 2 is a hypothesis with the highest speech recognition score.

A hypothesis 3 is a hypothesis with the lowest speech recognition accuracy.

A hypothesis 4 is a hypothesis with the lowest speech recognition score.

The hypothesis 1 and the hypothesis 2 are hypotheses with a high speech recognition accuracy (or estimated to have high speech recognition accuracy), which are difficult to distinguish from the oracle hypothesis. Meanwhile, the hypothesis 3 and the hypothesis 4 are hypotheses with a low speech recognition accuracy (or estimated to have low speech recognition accuracy), which are easy to distinguish (required to be distinguished reliably) from the oracle hypothesis. When other hypotheses are narrowed down to only the four hypotheses, the number of times of update of the model parameters can be reduced to $E \times M \times N \times 2 \times 4$.

When it is considered that the variety of alternative hypotheses of an oracle hypothesis cannot be ensured sufficiently with only the above-mentioned four hypotheses, a predetermined number of hypotheses extracted in accordance with a predetermined rule from among the remaining N−5 hypotheses, which are obtained by excluding an oracle hypothesis and these four hypotheses from the N-best hypotheses, may be selected and used as alternative hypotheses together with the four hypotheses. For example, Q hypotheses may be selected at equal intervals or randomly from among the remaining N−5 hypotheses, which are obtained by excluding an oracle hypothesis and these four hypotheses, as the other hypothesis of the two hypotheses, and used as the other hypothesis together with the four hypotheses. At this time, the number of times of update of the model parameters is $E \times M \times N \times 2 \times (4+Q)$. For example, Q is 5 to 50.

[Evaluation]

N-best reranking in the first embodiment and N-best reranking described in NPL 1 were compared for evaluation in actuality. Table 1 is a table indicating a result of performing 100 (=N) best reranking evaluation that is compared with N-best reranking described in NPL 1 for evaluation by using a CSJ speech corpus. The numerical values of the table indicate a word error rate (WER) [%], and represent Development (Dev) and Evaluation (Eval).

TABLE 1

| No. | Model | Dev | Eval |
| --- | --- | --- | --- |
| 1 | Single-encoder DDM | 16.4 | 13.7 |
| 2 | Eight-encoder DDM | 16.1 | 13.4 |
| 3 | 2 with fwd & bwd LSTMLM scores | 15.2 | 12.6 |
| 4 | Oracle | 11.6 | 9.7 |

The serial number "1" of the table 1 indicates a result of N-best reranking described in NPL 1. The serial number "2" of the table 1 indicates a result in a case where the reranking device 10 according to the first embodiment has eight auxiliary models. The serial number "3" indicates a result in a case where the word prediction scores of forward and backward LSTMLM are used as auxiliary features in the eighteenth dimension and the nineteenth dimension in addition to the condition of the serial number "2". The serial number "4" indicates an oracle for reference.

As indicated in the table 1, WER can be reduced sufficiently with the reranking method described in NPL 1 of the serial number "1", but WER can be reduced further with the reranking device 10 having eight auxiliary models of the serial number "2". Furthermore, as indicated in the evaluation result of the serial number "3", it was confirmed that complementary WER reduction effects were obtained by using the word prediction scores of LSTMLM in both directions and eight auxiliary models. Furthermore, in addition to the case of the serial number "2", evaluation was performed with the configuration in which the number of auxiliary models was set to 2 or 4, and it was confirmed that WER tended to be reduced as the number of auxiliary models was increased.

On the basis of this evaluation result, the reranking device 10 according to the first embodiment can reduce WER more stably than the reranking method described in NPL 1.

Third Embodiment

Figure 9:
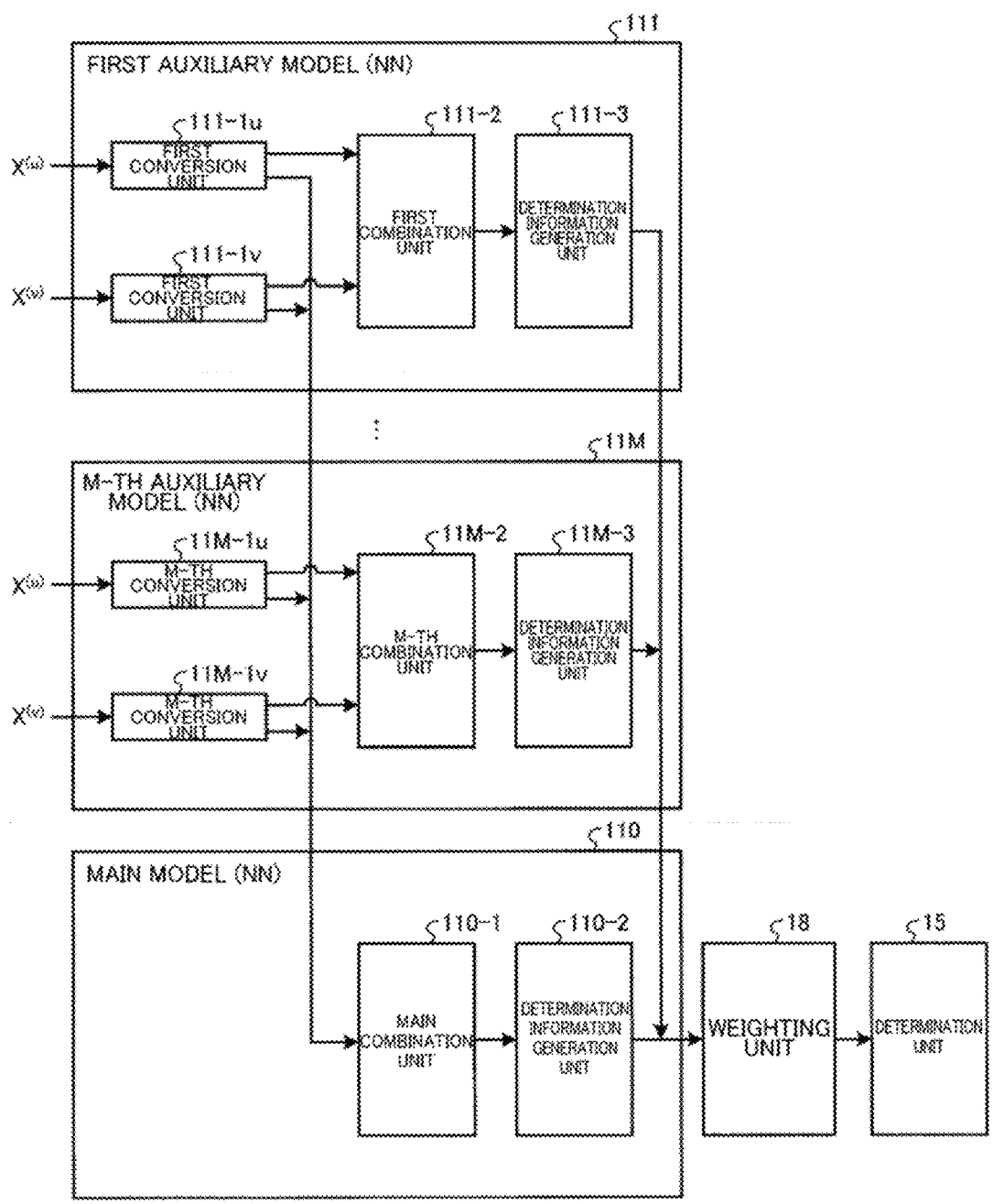
FIG. 9 is a diagram illustrating a configuration of main components of a reranking device according to a third embodiment.

The reranking device 10 according to the first embodiment performs determination by using output of the main model 110, but the reranking device 10 may perform determination by using the output of each auxiliary model in addition to output of the main model 110. FIG. 9 is a diagram illustrating a configuration of main components of a reranking device according to a third embodiment.

As illustrated in FIG. 3, the reranking device includes a weighting unit 18 at a former stage of the determination unit 15. The weighting unit 18 acquires all the pieces of determination information output from the first auxiliary model 111 to M-th auxiliary model 11M and the main model 110, and calculates a weighted sum for each piece of determination information.

A weight corresponding to each piece of determination information is set in advance. The weighting unit 18 may give equal weights to all the auxiliary models and the main model 110 for each piece of determination information. Furthermore, the weighting unit 18 may give larger weights to the main model 110 than other auxiliary models. Furthermore, the weighting unit 18 may include a one-layer linear NN that has learned a weight for each piece of determination information in advance, and acquire a weight for each determination target when each piece of determination information is input.

The determination unit 15 determines which accuracy of two hypotheses is higher based on the value of the weighted sum calculated by the weighting unit 18. For example, on the assumption that each piece of determination information indicates a probability of selection of the $W^{(u)}$, the determination unit 15 selects the hypothesis $W^{(u)}$ when a value normalized so that the weighted sum of pieces of determination information falls within the range of from 0 to 1 is equal to or larger than 0.5, or selects the hypothesis $W^{(v)}$ otherwise.

[Processing Procedure of Determination Processing]

Figure 10:
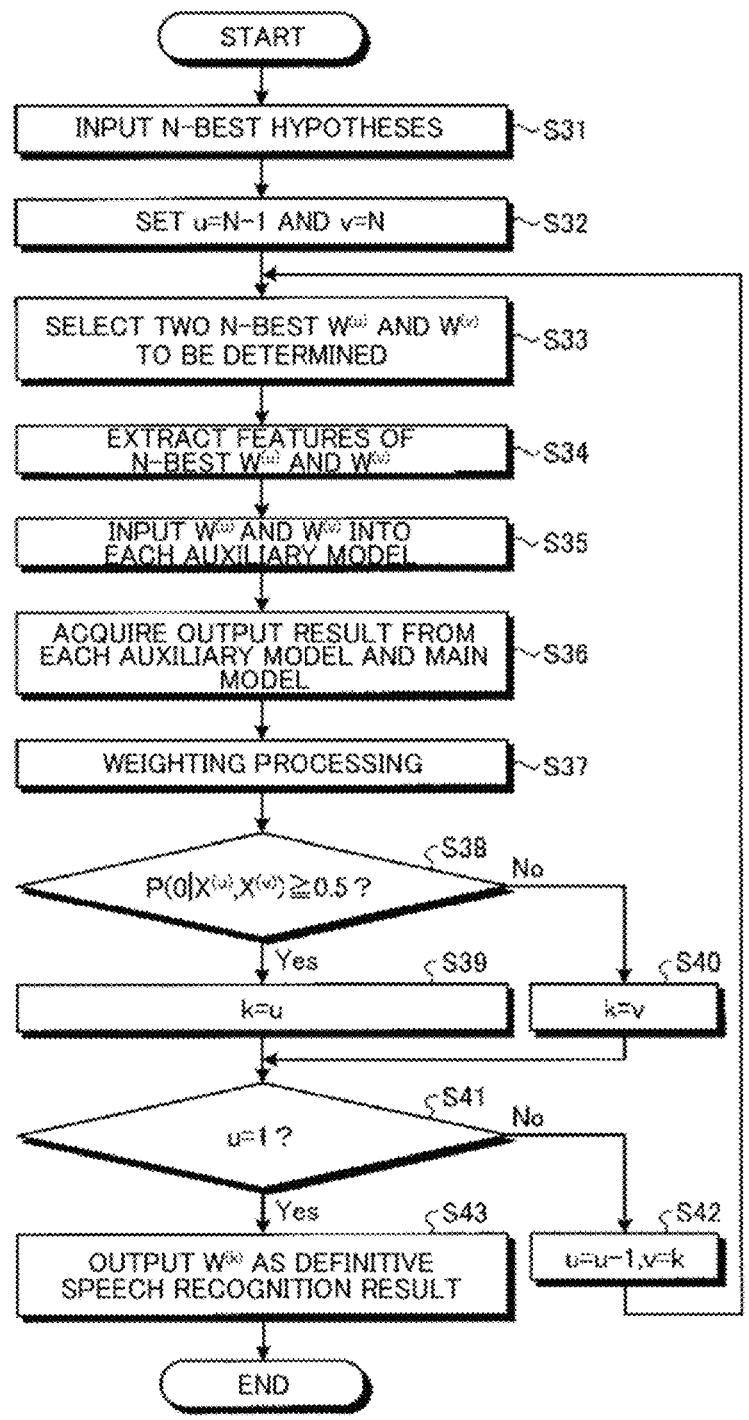
FIG. 10 is a flow chart illustrating a processing procedure of reranking processing according to the third embodiment.

FIG. 10 is a flow chart illustrating a processing procedure of reranking processing according to the third embodiment.

Step S31 to Step S36 illustrated in FIG. 10 are the same as Step S1 to Step S6 illustrated in FIG. 4. The weighting unit 18 acquires all the pieces of determination information output from the first auxiliary model 111 to M-th auxiliary model 11M and the main model 110, and performs weighting processing of calculating a weighted sum for each piece of determination information (Step S37). Then, which accuracy of two hypotheses is higher is determined based on the value of the weighted sum calculated by the weighting unit 18. Step S38 to Step S43 are the same as Step S7 to Step S12 illustrated in FIG. 4.

Effect of Third Embodiment

As described in the third embodiment, it is also possible to perform determination by using determination information output from all the auxiliary models in addition to determination information output from the main model 110. At this time, in the third embodiment, weighting is performed for each piece of determination information depending on each auxiliary model or the main model 110, and which accuracy of two hypotheses is higher is determined based on the value of the weighted sum, and thus it is possible to keep the accuracy of extracting an oracle hypothesis.

In this embodiment, comparison processing is performed for all the hypotheses, and thus it is also possible to sort N-best hypotheses.

In the first to third embodiments, description has been given of the first auxiliary model 111 to M-th auxiliary model 11M and the main model 110 exemplified in FIG. 1 as a model for reranking N-best hypotheses of speech recognition. Application of the first auxiliary model 111 to M-th auxiliary model 11M and the main model 110 in the first to third embodiments is not limited to N-best hypotheses of speech recognition, and the first auxiliary model 111 to M-th auxiliary model 11M and the main model 110 can be applied to various kinds of tasks that adopt N-best hypotheses. For example, this embodiment can be applied to machine translation, sentence summarization, or other tasks. Furthermore, the sequence of this embodiment can be applied not only to a character string but also to a plurality of sequences including numbers or alphabets.

Thus, the first to third embodiments can determine which of two sequences has a higher accuracy (has fewer errors) by using a model represented by a NN as long as the two sequences belong to a plurality of sequences that are given as solution candidates for one input. Then, in the first to third embodiments, a sequence determined to have a higher accuracy is kept as a comparison target among two sequences, the other sequence is excluded from the comparison target, the sequence determined to have a higher accuracy is selected as one hypothesis out of two sequences, and any one of sequences for which determination has not been performed among a plurality of sequences is selected as the other hypothesis. Then, in the first to third embodiments, determination processing and selection processing are executed sequentially until a predetermined condition is reached. In this manner, according to the first to third embodiments, it is possible to output a sequence, which is kept as a comparison target when a predetermined condition is reached, as a sequence with the highest accuracy, namely, a definitive output.

Furthermore, in this case, in the first to third embodiments, multitask learning is performed by the first auxiliary model 111 to M-th auxiliary model 11M and the main model 110 represented by such a NN as to be capable of determining which of two sequences has a higher accuracy when features of two sequences among a plurality of sequences for learning for which the accuracy is known are given. Then, in the first to third embodiments, a training label, which indicates correctness when a sequence (with fewer errors) with a higher accuracy among two sequences is assigned with an order higher than that of the other sequence, is given to the first auxiliary model 111 to M-th auxiliary model 11M and the main model 110 to perform learning. Then, in the first to third embodiments, a training label, which indicates incorrectness when a sequence (with fewer errors) with a higher accuracy among two sequences is assigned with an order lower than that of the other sequence, is given to the first auxiliary model 111 to M-th auxiliary model 11M and the main model 110 to perform learning. In the first to third embodiments, with the first auxiliary model 111 to M-th auxiliary model 11M and the main model 110, it is possible to accurately compare two sequences on a one-to-one basis, and as a result, it is possible to accurately obtain a sequence with the highest accuracy.

[System Configuration and Others]

Each component of each device is illustrated in terms of functional concept, and is not necessarily required to be configured physically as illustrated. In other words, the specific mode of diversification or integration of each device is not limited to the illustration, and all or a part thereof can be diversified or integrated for configuration functionally or physically in any unit depending on various kinds of loads or usage status, for example. For example, the reranking device 10 and the learning device 20 may be an integrated device. Furthermore, all or any part of processing functions to be implemented by each device may be implemented by a CPU and a program interpreted and executed by the CPU, or may be implemented as hardware by a wired logic.

Furthermore, regarding the processing described in this embodiment, all or a part of processing described as being executed automatically can also be executed manually, or all or a part of processing described as being executed manually can also be executed automatically by a publicly known method. Furthermore, each processing described in this embodiment may not only be executed chronologically in accordance with the order of description, but also be executed in parallel or independently depending on the processing capability or necessity of a device that executes the processing. In other cases, information including the processing procedure, control procedure, specific name, various kinds of data or parameters shown in the above description or the drawings can be changed freely unless otherwise specified.

[Program]

Figure 11:
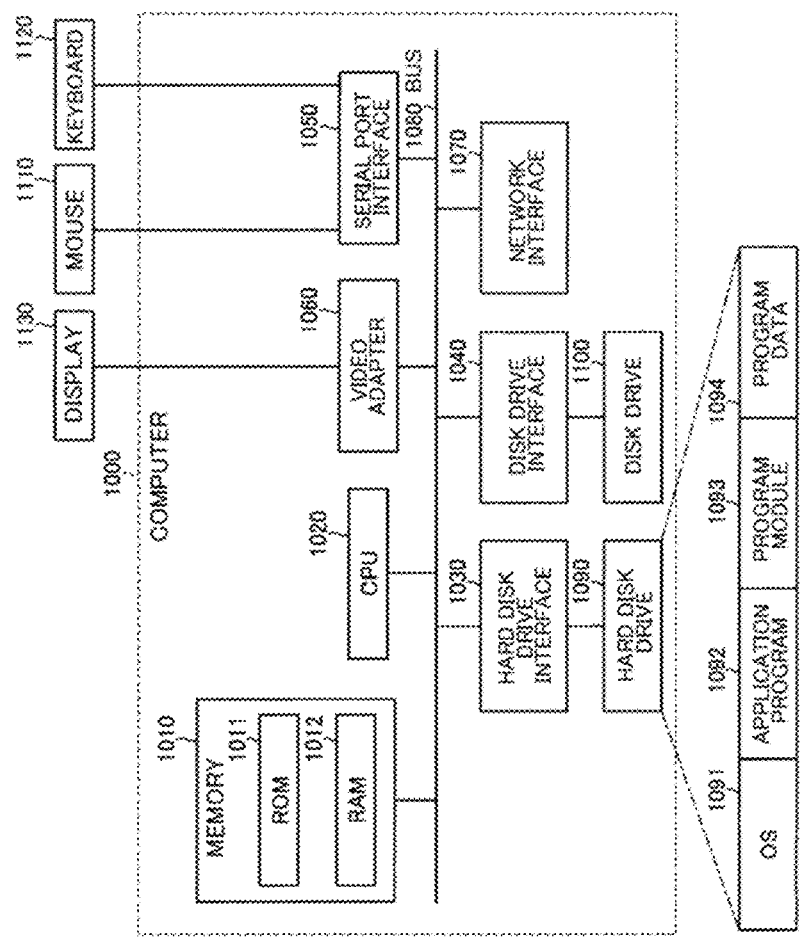
FIG. 11 is a diagram illustrating an example of a computer that implements the reranking device and the learning device through execution of a program.

FIG. 11 is a diagram illustrating an example of a computer that implements the reranking device 10 and the learning device 20 through execution of a program. The computer 1000 includes, for example, a memory 1010 and a CPU 1020. Furthermore, the computer 1000 includes a hard disk drive interface 1030, a disk drive interface 1040, a serial port interface 1050, a video adaptor 1060, and a network interface 1070. Those components are connected to one another via a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. For example, a detachable storage medium such as a magnetic disk or an optical disc is inserted into the disk drive 1041. The serial port interface 1050 is connected to, for example, a mouse 1110 and a keyboard 1120. The video adaptor 1060 is connected to, for example, a display 1130.

The hard disk drive 1031 stores, for example, an OS 1091, an application program 1092, a program module 1093, and program data 1094. That is, a program that defines each processing of the reranking device 10 or the learning device 20 is implemented as the program module 1093 in which a code executable by the computer 1000 is described. The program module 1093 is stored in, for example, the hard disk drive 1031. For example, the program module 1093 for executing processing similar to that of the functional configuration of the reranking device 10 or the learning device 20 is stored in the hard disk drive 1031. The hard disk drive 1031 may be replaced with a solid state drive (SSD).

Settings data to be used in processing of the above-mentioned embodiment is stored in, for example, the memory 1010 or the hard disk drive 1031 as the program data 1094. Then, the CPU 1020 reads the program module 1093 or the program data 1094 stored in the memory 1010 or the hard disk drive 1031 into the RAM 1012, and executes the program module 1093 or the program data 1094 as necessary.

The program module 1093 or the program data 1094 is not necessarily stored in the hard disk drive 1031, and may be stored in, for example, a detachable storage medium, and read by the CPU 1020 via the disk drive 1041 or the like. Alternatively, the program module 1093 and the program data 1094 may be stored in other computers connected via a network (for example, local area network (LAN) or wide area network (WAN)). Then, the program module 1093 and the program data 1094 may be read from other computers by the CPU 1020 via the network interface 1070.

In the above, description has been given of the embodiments to which the invention made by the inventor is applied, but the description and the drawings, which form a part of the disclosure of the present invention according to the embodiments, do not limit the present invention. In other words, other embodiments, examples, and applied techniques made by a person skilled in the art or the like on the basis of the embodiments all fall within the scope of the present invention.

REFERENCE SIGNS LIST

2 Speech recognition device
10 Reranking device
11, 21 Model storage unit
12 Hypothesis input unit
13 Hypothesis selection unit
14 Feature extraction unit 15 Determination unit
16 Execution control unit
17 Output unit
18 Weighting unit
20 Learning device
22 Hypothesis input unit
23 Learning unit
110 Main model
111 to 11M First auxiliary model to M-th auxiliary model
231 Training label assignment unit
232 Switching unit

The invention claimed is:

1. A determination device, comprising:
input circuitry configured to receive input of N-best hypotheses associated with scores of a speech recognition accuracy;
selection circuitry configured to select two hypotheses to be determined from among the input N-best hypotheses; and
determination circuitry configured to determine which accuracy of two hypotheses is higher by using:
a plurality of auxiliary models represented by a neural network as to be capable of converting, when the selected two hypotheses are given, the two hypotheses into hidden state vectors, and determining which of the two hypotheses is higher based on the hidden state vectors of the two hypotheses; and
a main model represented by a neural network as to be capable of determining which of the two hypotheses is higher based on the hidden state vectors of the two hypotheses converted by the plurality of auxiliary models, respectively,
wherein each auxiliary model is configured to convert the two hypotheses into hidden state vectors by using a recurrent neural network, and output a posterior probability indicating correctness of an order of accuracy of two sequences based on the hidden state vectors by using a neural network, and
wherein the main model is configured to output a posterior probability indicating correctness of an order of accuracy of two sequences based on the hidden state vectors of the two hypotheses converted by the plurality of auxiliary models, respectively, by using a neural network.

2. The determination device according to claim 1, wherein the selection circuitry is configured to select the two hypotheses in ascending order of score of the N-best hypotheses.

3. The determination device according to claim 1, wherein the determination circuitry is configured to determine which of the two hypotheses is higher based on determination information output from the main model or a value of a weighted sum calculated for determination information output from each auxiliary model and the determination information output from the main model.

4. A learning device, comprising:
an input circuitry configured to receive input of two hypotheses for learning for which a speech recognition accuracy is known; and
a learning circuitry configured to cause a plurality of auxiliary models and a main model to perform multi-task learning that assumes each neural network individually performs a task of determining which accuracy of the two hypotheses is higher, the plurality of auxiliary models being represented by a neural network as to be capable of converting, when the two hypotheses are given, the two hypotheses into hidden state vectors, and determining which of the two hypotheses is higher based on the hidden state vectors of the two hypotheses, the main model being represented by a neural network as to be capable of determining which of the two hypotheses is higher based on the hidden state vectors of the two hypotheses converted by the plurality of auxiliary models, respectively,
wherein each auxiliary model converts the two hypotheses into hidden state vectors by using a recurrent neural network, and outputs a posterior probability indicating correctness of an order of accuracy of two sequences based on the hidden state vectors by using a neural network, and
wherein the main model outputs a posterior probability indicating correctness of an order of accuracy of two sequences based on the hidden state vectors of the two hypotheses converted by the plurality of auxiliary models, respectively, by using a neural network.

5. The learning device according to claim 4, wherein the learning circuitry is configured to give a correct label when a hypothesis with a higher speech recognition accuracy out of the two hypotheses is given an order higher than an order of the other hypothesis to cause the plurality of auxiliary models and the main model to perform learning, or give an incorrect label when a hypothesis with a higher speech recognition accuracy out of the two hypotheses is given an order lower than an order of the other hypothesis to cause the plurality of auxiliary models and the main model to perform learning.

6. The learning device according to claim 4, wherein the learning circuitry is configured to calculate each predetermined loss for each task executed by each neural network, and update a value of a parameter of each neural network based on a weighted sum of the predetermined losses.

7. A determination method, comprising:
a procedure of receiving input of N-best hypotheses associated with scores of a speech recognition accuracy;
a procedure of selecting two hypotheses to be determined from among the input N-best hypotheses; and
a procedure of determining which accuracy of two hypotheses is higher by using:
a plurality of auxiliary models represented by a neural network as to be capable of converting, when the selected two hypotheses are given, the two hypotheses into hidden state vectors, and determining which of the two hypotheses is higher based on the hidden state vectors of the two hypotheses; and
a main model represented by a neural network as to be capable of determining which of the two hypotheses is higher based on the hidden state vectors of the two hypotheses converted by the plurality of auxiliary models, respectively,
wherein each auxiliary model converts the two hypotheses into hidden state vectors by using a recurrent neural network, and outputs a posterior probability indicating correctness of an order of accuracy of two sequences based on the hidden state vectors by using a neural network, and
wherein the main model is configured to output a posterior probability indicating correctness of an order of accuracy of two sequences based on the hidden state vectors of the two hypotheses converted by the plurality of auxiliary models, respectively, by using a neural network.

8. A non-transitory computer readable medium including a determination program for causing a computer to execute:

a step of receiving input of N-best hypotheses associated with scores of a speech recognition accuracy;

a step of selecting two hypotheses to be determined from among the input N-best hypotheses; and a step of determining which accuracy of two hypotheses is higher by using:

a plurality of auxiliary models represented by a neural network as to be capable of converting, when the selected two hypotheses are given, the two hypotheses into hidden state vectors, and determining which of the two hypotheses is higher based on the hidden state vectors of the two hypotheses; and a main model represented by a neural network as to be capable of determining which of the two hypotheses is higher based on the hidden state vectors of the two hypotheses converted by the plurality of auxiliary models, respectively, wherein each auxiliary model converts the two hypotheses into hidden state vectors by using a recurrent neural network, and outputs a posterior probability indicating correctness of an order of accuracy of two sequences based on the hidden state vectors by using a neural network, and wherein the main model is configured to output a posterior probability indicating correctness of an order of accuracy of two sequences based on the hidden state vectors of the two hypotheses converted by the plurality of auxiliary models, respectively, by using a neural network.

* * * * *